May 23, 1961 W. RICHTER ET AL 2,984,899
METHOD OF JOINING PIPE SECTIONS BY HEATING AND SUBSEQUENT COOLING
Filed March 12, 1956 3 Sheets-Sheet 1
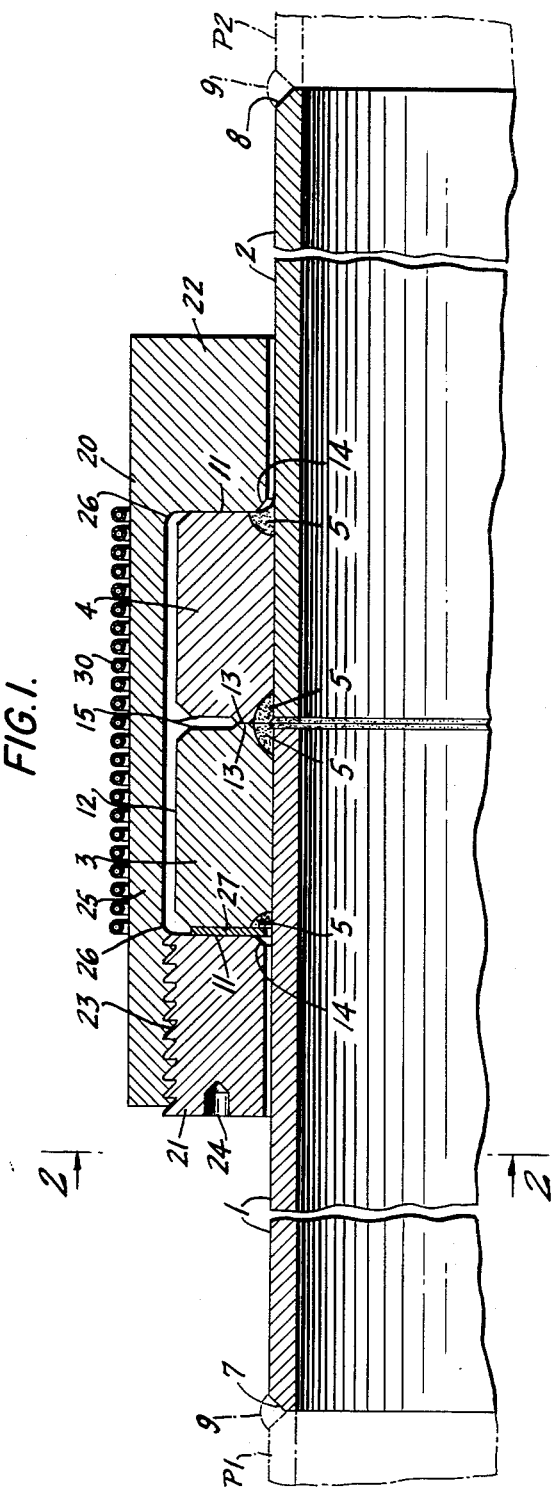

May 23, 1961 W. RICHTER ET AL 2,984,899
METHOD OF JOINING PIPE SECTIONS BY HEATING AND SUBSEQUENT COOLING
Filed March 12, 1956 3 Sheets-Sheet 2

May 23, 1961  W. RICHTER ET AL  2,984,899
METHOD OF JOINING PIPE SECTIONS BY HEATING AND SUBSEQUENT COOLING
Filed March 12, 1956  3 Sheets-Sheet 3
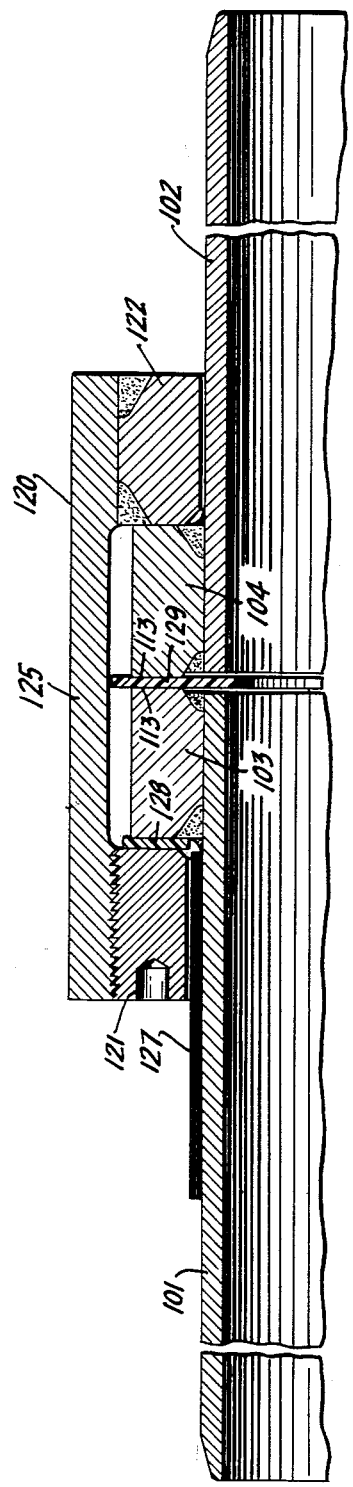
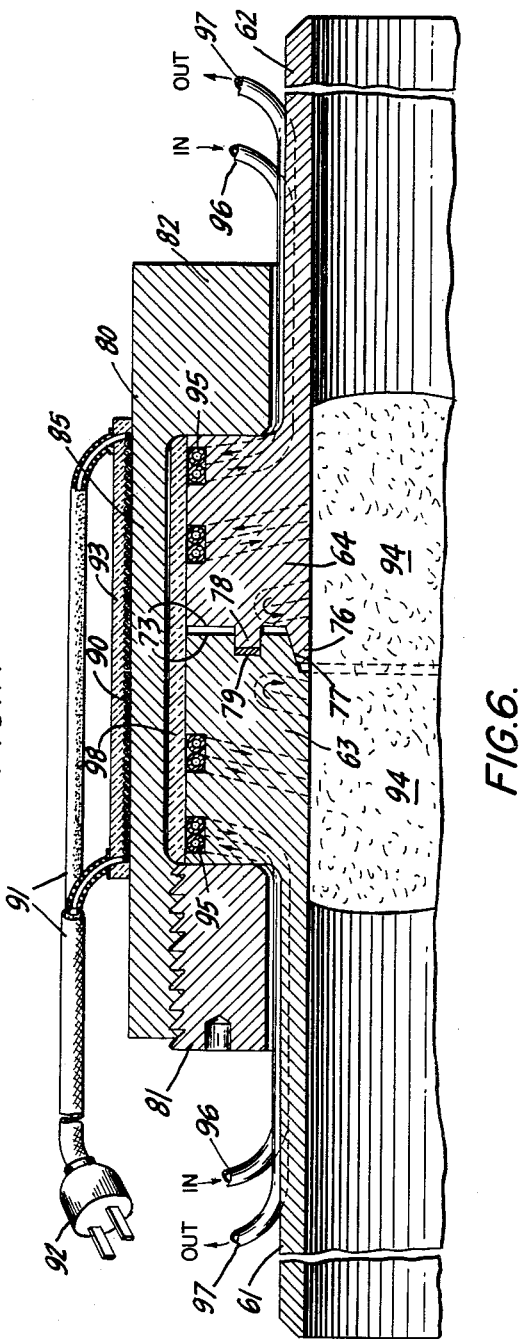
FIG. 7.
FIG. 6.

United States Patent Office 2,984,899
Patented May 23, 1961

2,984,899

METHOD OF JOINING PIPE SECTIONS BY HEATING AND SUBSEQUENT COOLING

Walther Richter, Milwaukee, Wis., and Roger Emanuel Risley, Bradford, Pa., assignors to Dresser Industries, Inc., a corporation of Delaware Filed Mar. 12, 1956, Ser. No. 571,104

4 Claims. (Cl. 29—447)

The present invention relates to coupling two end-abutting pipe sections. The term "pipe sections" is used in a generic sense to mean pipe lengths, fittings, sleeves, tubes, conduits, cylinders or other hollow, fluid-containing members.

Flange joints have heretofore been used in coupling pipe sections in end-abutting relation. In the usual flange joint, flanges provided at the abutting ends of two pipe sections are bolted together by a plurality of bolts parallel to the axis of the pipe. The two flanges are drawn together by tightening the bolts. The strength of such joints is limited by the fact that when more or larger bolts are used to get greater strength, the flanges are weakened by the additional or larger bolt holes needed to receive the bolts. When high strength is required, it has been found impossible to use enough bolts without excessive weakening of the flanges.

In a flange joint no appreciable axial movement between adjacent pipe sections can be tolerated. This is particularly true if there is metal-to-metal engagement between the flanges or if any gasket material used between the flanges is relatively hard or non-resilient. To maintain a tight joint, the inter-engaging faces must be pressed together with sufficient force to withstand the internal pressure of the pipe line. The coupling must be able to withstand external forces to which it is subjected in use, while maintaining the required unit pressure between abutting faces of the flange joint. In pipe lines subject to wide temperature variation, the expansion and contraction of the pipe may subject the pipe joints to high forces limited only by the strength of the pipe. Mechanical forces may also be applied to the pipe joints by minor earthquakes or settling of the ground. To withstand such forces, it is desirable to provide a pipe joint having a strength greater than that of the pipe. It has been found difficult to achieve this with bolted flange joints.

The problem is further complicated if it is desired to provide an insulating joint in order to connect two pipe sections while keeping them electrically insulated from one another. Conventional insulating flange joints give a great deal of trouble. It is necessary not only to insulate the two flanges from one another but also to insulate the connecting bolts from at least one of the flanges. This requires the bolt holes to be larger to accommodate not only the bolts but also the insulation so that the point of diminishing strength with increase in the number of bolts is reached even sooner. The insulating material under the bolt heads or nuts is subjected to high unit pressures. Such joints are subject to failure by breakage of the insulation by mechanical forces to which the pipe joint is subjected in use. Moreover, there is an inherent difficulty in getting workmen to assemble the coupling properly when there is a large number of bolts that need to be tightened uniformly.

It is an object of the present invention to provide a new way of joining end-abutting pipe sections to provide greater strength and higher sealing pressures. In accordance with the invention, the sealing pressure can be accurately predetermined so as to assure sufficient pressure for the conditions of each particular pipe line while avoiding excessive pressure between abutting ends of the pipe. A further advantage of the invention is that the steps required in making up or disconnecting a coupling are very simple and easily performed. Pipe couplings in accordance with the invention have the additional advantage of being of relatively small overall diameter and having a smooth exterior shape so that they occupy minimum space and can readily be insulated, covered or coated.

It is a further object of the invention to provide an improved insulating coupling having high mechanical strength, high dielectric strength and exceptional durability.

The objects and advantages of the invention will appear more fully from the following description and claims in conjunction with the accompanying drawings in which:

Fig. 1 is a partial axial section of a pipe joint made in accordance with the present invention.

Fig. 2 is a fragmentary end elevation partially in section taken approximately on the line 2—2 in Fig. 1.

Fig. 6 is a partial axial section of a third embodiment.

Fig. 7 is a partial axial section of an insulating pipe joint made in accordance with the invention.

Figure 3:
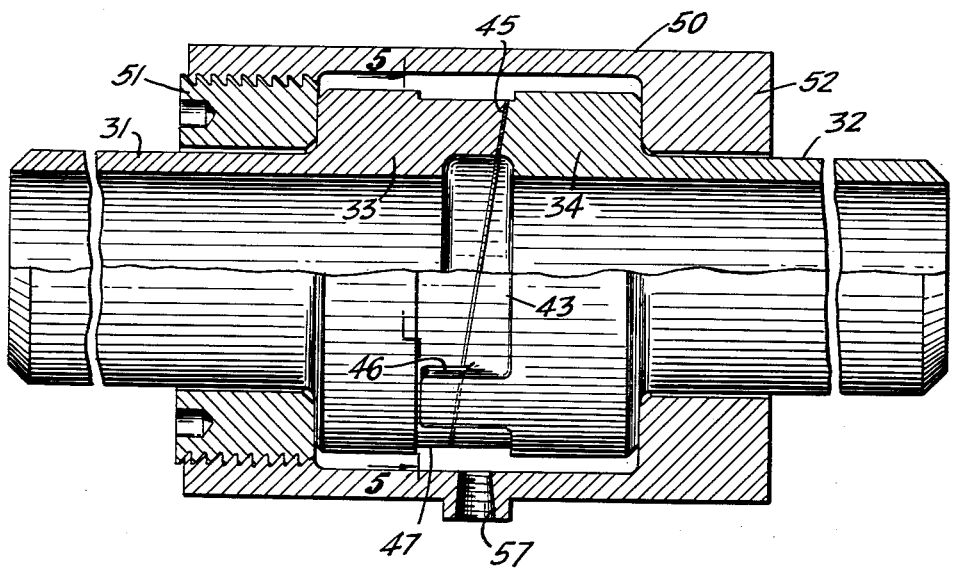
Fig. 3 is an axial section of a second embodiment with portions shown in side elevation.

In accordance with the invention, the abutting ends of two pipe sections are drawn together and held in pressure engagement by means of a tension sleeve surrounding end portions of the pipe and connected to the pipe at points spaced back from the end faces of the pipe, relative thermal expansion and contraction of the end portions of the pipe and surrounding sleeve in a direction longitudinal of the pipe being utilized to obtain and maintain the desired engagement pressure.

In the embodiment of the invention shown in Figs. 1 and 2, axially aligned pipe sections 1 and 2 are provided at their abutting ends with radially projecting annular flanges 3 and 4 which are shown united to the pipe sections by welds 5. The opposite ends 7 and 8 of the pipe sections are shown beveled and are adapted to be welded respectively to abutting pipe sections P1 and P2, the welds being indicated in broken lines at 9. It is contemplated that the pipe joint in accordance with the invention may advantageously be preassembled and then welded into a pipe line. In this event, the pipe sections 1 and 2 will be relatively short, being of suitable length for convenient handling and welding.

Each of the flanges 3, 4 has a substantially radial inner end face 11, a cylindrical peripheral surface 12, and an outer end face 13. The inner end face 11 is merged smoothly into the outer surface of the pipe by a fillet 14. The outer end faces 13 of the flanges 3, 4 are designed to provide the desired area of engagement between the flanged pipe ends. Where there is metal-to-metal contact between the flanges as in Fig. 1, the outer end faces are recessed as indicated at 15 so that the faces 13 engage one another along a narrower annular band. The radial width of the band of engagement of the faces 13 depends on the nature of the material forming these faces in order to obtain optimum sealing conditions. With inter-engagement between steel faces, the radial width of the faces is suitably reduced. In Fig. 1, the width of the band of engagement between the faces 13 is shown as being approximately the same as the thickness of the pipe wall and may be even less. If softer material is used, or if a gasket is interposed between the faces, the area of engagement is correspondingly greater and may be the full radial width of the flanges. The radial position of the band of engagement between the flanges—if less than the full radial width of the end faces—may be varied according to the conditions to be met. If it is desired to provide an uninterrupted interior pipe wall, the engagement is immediately adjacent the inner surfaces of the pipe. Unlike the flanges of conventional flange joints, the flanges 3 and 4 are relatively long and narrow. The axial length of each of the flanges is preferably greater than its radial width and is shown in Fig. 1 as being more than one and a half times as great.

The flanges 3 and 4 are drawn tightly together to make a fluid tight joint between them by the relative thermal expansion and contraction in a longitudinal direction of the flanges and a tension sleeve or shell 20 that surrounds the flanges. At its opposite ends, the tension sleeve 20 is provided with inwardly projecting ring portions 21 and 22 having inner end faces engaging the end faces 11 of the flanges 3 and 4. The ring portion 21 is secured to the sleeve 20 so as to be adjustable relative to the sleeve in a longitudinal direction and for this purpose is provided with external threads 23 engaging corresponding internal threads provided in the end portion of the sleeve. The threads are preferably of the saw tooth or buttress type as shown. The ring portion 21 is provided with tool-engaging abutments shown as holes 24 for the purpose of rotating the ring portion relative to the sleeve and thereby adjusting it longitudinally of the sleeve. The other ring portion 22 may be similarly threaded, but for simplicity of construction is welded to or made integral with the sleeve 20 as shown. The ring portions 21 and 22 are similar in shape and size to the flanges 3 and 4, being shown as having greater longitudinal length than radial thickness. The intermediate portion 25 of the sleeve 20 between the ring portions 21 and 22 has a wall thickness approximately equal to or greater than that of the pipe sections 1 and 2. The inner surface of the intermediate sleeve portion 25 is spaced radially from the peripheral surfaces 12 of the flanges 3 and 4 and merges smoothly into the inner end faces of the ring portions 21 and 22 by rounded corners 26. The inner diameter of the ring portions 21 and 22 is likewise greater than the outer diameter of the pipe sections 1 and 2 so that the ring portions are movable longitudinally of the pipe except for engagement with the flanges 3 and 4. To compensate for any slight inaccuracies in the machining of the elements of the joint a washer 27 of somewhat softer material for example copper, may be interposed between one or both of the ring portions 21, 22 and the flanges 3, 4 of the pipe. The material of the washer or washers 27 is soft enough to flow to relieve localized pressure while firm enough to transmit the full force to be applied to the flanges when the force is properly distributed over the bearing areas of the ring portions 27 and the flanges 3, 4.

In order to obtain predetermined movement of the ring portion 21 relative to the sleeve 20 for the purpose explained below, the ring portion and sleeve are provided with suitable indexing means which are illustrated (Fig. 2) as a scale 28 on the outer end face of the ring portion 21 and a cooperating index 29 on the adjacent end face of the sleeve 20.

In accordance with the invention, forces acting longitudinally of the pipe and created by relative thermal expansion of the sleeve 20 and flanges 3 and 4 in a longitudinal direction are utilized for pressing the flanges together with predetermined pressure to obtain a fluid tight seal and for maintaining the required sealing pressure under all conditions anticipated in service. While such forces can be obtained by using materials having different coefficients of thermal expansion, it is more practical to use the same or similar materials, for example steel, for the sleeve and flanges and to effect relative thermal expansion by producing a temperature differential between the sleeve 20 and the flanges 3 and 4 during assembly of the coupling as described below so that the temperature of the sleeve is substantially higher than that of the flanges. In the embodiment of Figs. 1 and 2, the means for producing such temperature differential is illustrated as being an induction coil 30 surrounding the intermediate portion 25 of the sleeve 20. Alternating current passed through the coil 30 induces currents in the intermediate portion of the sleeve thereby raising the temperature of the sleeve. The voltage and frequency of the current applied to the coil 30 are selected so as to heat the sleeve quickly with minimum heating of the flanges 3 and 4. The radial space between the flanges and the sleeve assists in isolating the flanges from the sleeve and retarding transfer of heat to the flanges. The coil 30 is preferably cooled, for example by forming it of tubing as shown and passing a cooling medium through the tubing. The application of heat is preferably confined to the intermediate portion 25 of the sleeve between the ring portions 21 and 22.

In making up a pipe joint in accordance with the invention, the flanged ends of pipe sections 1 and 2 are brought together, the sleeve 20 is slipped over the flanges 3 and 4 as shown in Fig. 1 and the ring portion 21—acting as an internal ring nut—is screwed into the threaded end portion of the sleeve. With all portions of the pipe joint at ambient temperature, the ring portion 21 is screwed in so as to bring the flanged ends of the pipe firmly together and also bring the inner end faces of the ring portions 21 and 22 into firm engagement with the end faces 11 of flanges 3 and 4 thereby taking all "slack" out of the joint. In this condition, the distance between the inner end faces of the ring portions 21 and 22 of the sleeve 20 is equal to the combined length of the flanges 3 and 4 in a direction longitudinal of the pipe. The intermediate portion 25 of the sleeve 20 is then heated by means of the induction coil 30 so as to raise the temperature of the intermediate sleeve portion substantially above that of the flanges 3 and 4. This causes the sleeve 20 to expand in a longitudinal direction relative to the flanges 3 and 4 so that the distance between the inner end faces of ring portions 21 and 22 is greater than the combined length of the flanges. While this temperature differential exists, the ring portion 21 is screwed into the sleeve 20 a predetermined amount which can be accurately gauged by the indices 28 and 29 provided on the adjacent end faces of the sleeve and ring portion. The sleeve 20 is then cooled or allowed to cool so as to equalize the temperature of the sleeve and flanges. The resulting shrinking of the sleeve in a longitudinal direction relative to the flanges produces forces which are transmitted through the ring portions 21 and 22 to the flanges 3 and 4 to press the flanged ends of pipe sections 1 and 2 tightly together.

The force with which the flanged pipe ends are pressed together is easily and accurately controllable by varying the amount the ring portion 21 is moved relative to the sleeve 20 while the sleeve is heated. If the ring portion 21 is screwed in farther, a higher force will be produced. The indexing means provided on the ring portion 21 and the sleeve facilitates obtaining any pressure desired. For example with a line pressure of 1000 p.s.i., it may be desired to have a contact pressure of 8,000 p.s.i. between the flange faces to assure a tight joint. As the area of engagement of the faces is known, the total force required can readily be calculated. It is then possible to calculate the amount this force would elongate or "stretch" the sleeve 20, since the diameter, thickness length and modulus of elasticity of the sleeve are known. By screwing in the ring portion 21 an amount equal to the calculated "stretch" while the sleeve is heated—after previously taking all slack out of the joint—the desired sealing pressure is obtained. If a softer surface layer or a gasket is interposed between the flanges 3, 4, the compression of such material under the design pressure can be calculated and taken into account in determining the amount of take-up of the ring portion 21. The same is true if there is a metal-to-metal contact of reduced area and the pressure to be applied is sufficiently high to upset the contact metal and thereby assure a pressure tight joint without the need of highly polished contact surfaces. The contact pressure to be obtained with the joint of the present invention is thus calculable and is limited only by the strength of the sleeve 20. As this sleeve is of larger diameter than the pipe and hence of larger cross sectional area for the same wall thickness and as still greater wall thickness of the sleeve may readily be used, it will be seen that the strength of the pipe joint in accordance with the invention may be made to exceed that of the pipe. In order to maintain adequate sealing pressure even when the pipe is stressed in tension to its ultimate limit, the strength of the pipe joint is preferably at least 20% greater than that of the pipe.

It will be noted that the pressure with which the sleeve 20 presses flanges 3 and 4 together is determined not by the temperature to which the sleeve is heated but by the dimensions and material of the sleeve and the amount the ring nut 21 is tightened while the sleeve is heated, all slack in the system having been removed prior to heating. Hence, the temperature to which the sleeve is heated is not critical and need be only great enough to provide sufficient expansion to permit the required tightening of the ring nut 21. As the amount of relative expansion and contraction obtained depends not only on the temperature differential but also on the length of the intermediate portion 25 of the sleeve between the ring portions 21 and 22, the length of this portion should be sufficiently great to provide the required expansion and contraction without requiring an excessive temperature differential. In practice it has been found that the intermediate portion of the sleeve should have a length of at least about 2 inches.

While the force pressing the flanges 3, 4 together is predetermined by the amount the ring nut 21 is screwed in while the sleeve is at a higher temperature than the flanges 3, 4, the pressure is not directly produced by screwing in the ring nut but by the subsequent shrinking of the sleeve in a longitudinal direction. Hence the force required to turn the ring nut 21 is only that required to overcome friction. The joint in accordance with the invention can thus be used on pipes of such large diameter that any pressure obtained by screwing in the ring nut 21 would be wholly inadequate. The joint in accordance with the invention has the further advantages that the cylindrical sleeve is of a convenient shape to be heated, there is only a single element—the ring nut 21—to be adjusted to obtain the desired pressure, and the contraction of the sleeve applies longitudinal pressure uniformly to the flanges all around the pipe.

If it is desired to disconnect the pipe joint, the sleeve 20 is heated, for example as described above, so as to free the ring nut 21 and permit it to be loosened. The heating is thereupon discontinued. When the ring nut 21 has been screwed all the way out, the sleeve 20 is slid toward the right as viewed in Fig. 1 until it is clear of the flange 3. The two pipe sections 1 and 2 may then be separated by relative lateral movement as well as by longitudinal movement. Hence, if a section of pipe or piece of equipment is provided at opposite ends with joints in accordance with the invention, it can be disconnected and moved out laterally without disturbing the rest of the pipe line.

Figure 4:
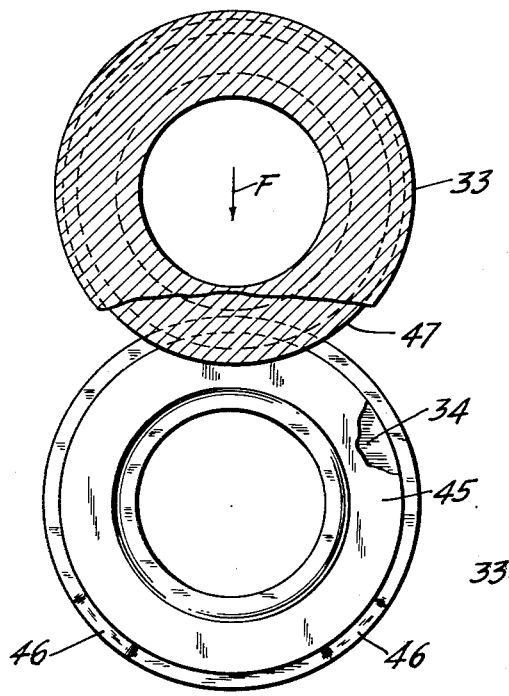
Figs. 4 and 5 are transverse sections taken approximately on the line 5—5 in Fig. 3 and illustrating successive steps of bringing the pipe sections into axial alignment in making a pipe joint.
Figure 5:
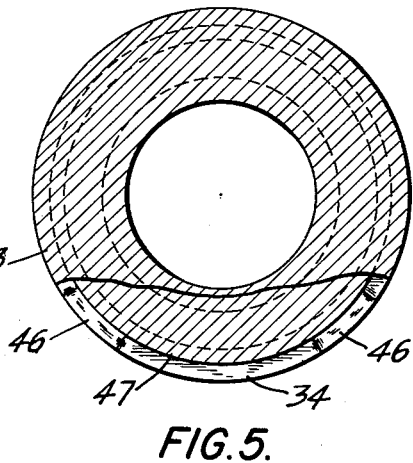

The assembly and disassembly of a pipe joint in accordance with the invention by relative lateral movement of adjacent pipe sections is further facilitated by the modification illustrated in Figs. 3 to 5. Two pipe sections 31 and 32 are provided at their adjacent ends with radially projecting annular flanges 33 and 34. The abutting end faces of the flanges 33 and 34 are disposed at an angle to a plane perpendicular to the axis of the pipe as clearly shown in Fig. 3. Because of this angle, lateral movement of the pipe section 31 in an upward direction as viewed in Fig. 3—when disconnecting the joint—results in the end faces of the flanges being immediately free from one another. This avoids the possible danger of the faces becoming scored by sliding one over the other as is necessary when the end faces are perpendicular to the axis of the pipe. The angle of inclination should be sufficiently great to permit the easy disassembly of the joint but not great enough to cause lateral slipping of the flanges when the joint is tightened. An angle of the order of 5 degrees to 10 degrees has been found satisfactory. A gasket 45 shown interposed between the flanged pipe ends is formed of softer metal than the flanges 33, 34 or of plastic or other suitable material. The gasket is omitted when metal-to-metal engagement of the flanges is desired.

In assembling or reassembling the joint, proper alignment of the two pipe sections is facilitated by aligning means shown as two lugs 46 which project axially from the flange 34 beyond the end face 43. These lugs are disposed radially outside the interengaging sealing faces of flanges 33 and 34 and are spaced apart a convenient angle, for example 30 to 90 degrees, being preferably disposed symmetrically with respect to a plane which passes through the axis of the pipe and is perpendicular to the end face 43 of the flange 34. The lugs are disposed on the "high" side of the flange i.e. the side that projects out furtherest in an axial direction. When the two pipe sections are brought together by lateral movement as indicated by the arrow F in Fig. 4, the lugs 46 engage a shoulder 47 of reduced diameter on the flange 33 and thereby positioning the pipe sections in axial alignment with one another. This aligning means can also be used when the engaging faces of the flanged pipe ends are perpendicular to the axis of the pipe as shown in Fig. 1.

The pipe joint of Fig. 3 further comprises a tension sleeve or shell 50 which is provided with radially inwardly projecting ring portions 51 and 52 and is of substantially the same construction as illustrated in Fig. 1. As in Fig. 1, suitable means (not shown) is provided for producing a temperature differential between the shell and the flanges 33 and 34 and the joint is made up and disconnected in the manner described above. In order to provide a continual check on the tightness of the joint, the shell 50 is provided with a threaded hole 57 to receive a drain pipe or suitable instrumentation to discharge or detect any fluid leaking out between the abutting faces of the flanges 33 and 34.

A further embodiment of the invention is shown in Fig. 6 where pipe sections 61 and 62 are shown provided at their abutting ends with radially outwardly projecting annular flange portions 63 and 64. The adjacent faces 73 of the flanges 63, 64 are provided with means for aligning the pipes shown in the form of an annular tapered collar 76 projecting from the face of flange 64 and received in a corresponding tapered annular recess 77 provided in flange 63. The flange 64 is also shown provided with an annular tongue 78 that is received in a corresponding annular recess provided in the flange 63. A gasket ring 79 seated in the recess and formed for example of copper, soft iron, plastic, elastomer material, etc. is engaged by the tongue 78. While the joint illustrated in Fig. 6 is shown as having both an aligning collar 76 and an annular tongue 78 it will be understood that either can be used independently of the other.

The pipe joint shown in Fig. 6 further comprises a tension sleeve or shell 80 surrounding the flanges 63 and 64 and provided at opposite ends with radially inwardly projecting ring portions 81 and 82 which are substantially like the corresponding parts shown in Fig. 1. The intermediate portion 85 of the sleeve 80 between the ring portions 81 and 82 is provided with heating means shown in the form of a resistance winding 90 wound around the sleeve and provided with leads 91 and a plug 92 for connecting it to a suitable power source. The efficiency of the heating winding is increased by a heat insulating covering 93.

Means is also provided for cooling the flange portions 63 and 64 to increase the temperature differential between the flanges and the sleeve. The cooling means is shown as comprising Dry Ice 94 (solid carbon dioxide) placed in the adjacent end portions of the pipe sections and/or cooling coils 95 provided in the flanges 63 and 64. The cooling coils 95 are provided with inlets 96 and outlets 97 for circulation of a cooling medium or refrigerant through the coils. The efficiency and effectiveness of the means for producing a temperature differential between the sleeve 80 and the flanges 63, 64 are further increased by providing an annular band of heat insulating material 98 in the radial space between the intermediate portion of the sleeve and the flanges.

An insulating pipe joint made in accordance with the invention is illustrated in Fig. 7. Pipe sections 101 and 102 are provided at their adjacent ends with radially outwardly projecting annular flange portions 103 and 104. The flanges are surrounded by a tension sleeve or shell 120 having at its opposite ends radially inwardly projecting ring portions 121 and 122. The intermediate portion 125 of the sleeve 120 is spaced radially outwardly from the peripheral surfaces of the flanges. The ring portion 121 of the sleeve 120 is likewise spaced radially outwardly of the pipe section 101 and is electrically insulated from said pipe section by an annular band of insulating material 127 formed for example by wrapping a sheet or strip of thin plastic insulating material around the pipe. The insulating band 127 preferably extends from the flange 103 to a point substantially beyond the outer face of the ring portion 121. An annular insulating ring or washer 128 is interposed between the ring portion 121 of sleeve 120 and the adjacent end face of the flange 103. The insulating washer 128 is of substantial thickness for example .075 to .1 inch and is formed of mica or plastic material having a high crushing strength of for example 35,000 p.s.i. A similar but wider and preferably also slightly thicker insulating ring or washer 129 is provided between the adjacent faces 113 of the flanges 103 and 104. The insulating washer 129 preferably projects radially outwardly beyond the flanges 103, 104 and also inwardly of the inner surface of the pipe 101, 102 to provide a Venturi effect which increases velocity and tends to keep the insulation clean. Insulating means similar to the band 127 and washer 128 may be provided between the ring portion 122 and the flanged end of pipe 102 but ordinarily such additional insulation is unnecessary.

The pipe joints illustrated in Figs. 3 to 7 are assembled and disassembled in the manner described with reference to Figs. 1 and 2, it being understood that means is provided for producing a temperature differential between the flanged end portions of the pipe and the surrounding tension sleeve although such means has been omitted from Figs. 3 and 7 for simplicity. It will further be understood that the individual features illustrated in the several embodiments are mutually interchangeable insofar as they are compatible with one another. It will be recognized by those skilled in the art that still other modifications may be made within the scope of the invention.

What we claim and desire to secure by Letters Patent is:

1. A method of joining two pipe sections in end-to-end relation which comprises providing radially outwardly-projecting flanges on the adjacent ends of said sections to provide opposed faces for sealing interengagement resistant to deformation, surrounding said flanges with a unitary elongated tubular tension sleeve while said flanges and said sleeve are at substantially ambient temperature, said sleeve being spaced radially from said flanges and having at its opposite ends radially inwardly projecting ring portions engaging opposite end faces of said flanges, at least one of said ring portions being axially movable relative to said sleeve to adjust the distance between said ring portions, said ring portions having engaging surfaces extending continuously throughout their circumference whereby pressure upon said flanges by said ring portions is applied throughout the circumference of said flanges, moving said ring portions toward one another to press adjacent faces of said flanged pipe sections firmly against one another, producing a temperature differential between a central portion of said sleeve surrounding said flanges and said flanges so that at least said central portion of the sleeve is at a substantially higher temperature than said flanges with the temperature differential being uniform circumferentially and, by reason of the resulting relative thermal expansion, the distance between said ring portions is greater than the combined axial length of said flanges, moving said ring portions toward one another a selected and calibrated amount to decrease the distance between them a selected amount and thereafter equalizing the temperature of said sleeve and flanges, the resulting relative longitudinal thermal contraction of said sleeve with respect to said flanges forcing said flanged pipe ends tightly together with a pressure predetermined by the selected reduction of the distance between said ring portions while the sleeve is at a higher temperature than said flanges.

2. A method according to claim 1, in which said temperature differential is produced at least in part by heating said sleeve above the ambient temperature.

3. A method according to claim 1, in which said temperature differential is produced at least in part by cooling said flanges below the ambient temperature.

4. A method of joining two pipe sections which comprises bringing said pipe sections together in end-to-end relation with opposed faces providing sealing interengagement resistant to deformation, surrounding the adjacent end portions of said pipe sections with a unitary elongated tubular tension sleeve while said end portions and said sleeve are at substantially ambient temperature, said sleeve being spaced radially from said end portion, said sleeve and end portions being thermally expandable in a direction longitudinal of the pipe, engaging opposite ends of said sleeve respectively with said pipe sections, said opposite sleeve ends having portions with engaging surfaces extending continuously throughout their circumference whereby pressure upon said pipe sections by said sleeve ends is applied throughout the circumference of said pipe sections, said sleeve end portions being axially movable relatively to each other to adjust the distance between said end portions and the points of engagement of said sleeve ends with said pipe sections being spaced longitudinally from one another and end portions of said pipe sections between said points of engagement being free of said sleeve, exerting force between said sleeve and pipe sections to press the end portions of said pipe sections firmly together and remove any slack in the joint between said pipe sections, producing a temperature differential between said sleeve and end portions of said pipe section surrounded by said sleeve so that the sleeve is at a substantially higher temperature than said end portions with the temperature differential being uniform circumferentially and, by reason of the resulting relative thermal expansion in a direction longitudinal of the pipe the distance between the points of engagement of the sleeve with said pipe sections is greater than the combined axial length of said end portions disposed between said points, thus providing slack in said joint, moving said sleeve end portion relative to at least one of said pipe sections a selected measured amount in a direction away from the end of said last named section to remove a predetermined amount of said slack, and thereafter equalizing the temperature of said sleeve and end portions of the pipe sections, the resulting thermal contraction of said sleeve with respect to said end portions in a direction longitudinal of the pipe forcing said pipe ends tightly together with a pressure predetermined by the measured amount of relative movement of said sleeve and pipe sections while the sleeve was at a higher temperature than said end portions.

References Cited in the file of this patent

UNITED STATES PATENTS

| | | |
|---|---|---|
| 570,170 | Greenfield | Oct. 27, 1896 |
| 746,440 | Austin | Dec. 8, 1903 |
| 1,149,518 | Holmes | Aug. 10, 1915 |
| 1,666,802 | Von Allmen | Apr. 17, 1928 |
| 2,016,375 | Kipnis | Oct. 8, 1935 |
| 2,211,983 | Parris | Aug. 20, 1940 |
| 2,333,243 | Glab | Nov. 2, 1943 |
| 2,342,120 | Cartwright | Feb. 22, 1944 |
| 2,342,422 | Morehead | Feb. 22, 1944 |
| 2,453,849 | Merriam | Nov. 16, 1948 |
| 2,465,669 | Tudor | Mar. 29, 1949 |
| 2,489,100 | Marco | Nov. 22, 1949 |
| 2,499,456 | Browne | Mar. 7, 1950 |
| 2,535,320 | Richardson | Dec. 26, 1950 |
| 2,539,056 | Brown | Jan. 23, 1951 |
| 2,571,265 | Leufven | Oct. 16, 1951 |
| 2,679,913 | Scott | June 1, 1954 |
| 2,695,184 | Hobbs | Nov. 23, 1954 |
| 2,724,175 | Kjellberg | Nov. 22, 1955 |

FOREIGN PATENTS

| | | |
|---|---|---|
| 469,725 | Great Britain | July 30, 1937 |
| 541,584 | Great Britain | Dec. 2, 1941 |